US009984116B2

(12) United States Patent
Rais Ghasem et al.

(10) Patent No.: US 9,984,116 B2
(45) Date of Patent: May 29, 2018

(54) AUTOMATED MANAGEMENT OF NATURAL LANGUAGE QUERIES IN ENTERPRISE BUSINESS INTELLIGENCE ANALYTICS

(71) Applicant: International Business Machines Corporation, Armonk, NY (US)

(72) Inventors: Mohsen Rais Ghasem, Kanata (CA); Kenny Truong, Kanata (CA); Ralf Vierich, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 14/839,701

(22) Filed: Aug. 28, 2015

(65) Prior Publication Data
US 2017/0060868 A1  Mar. 2, 2017

(51) Int. Cl.
*G06F 17/30* (2006.01)
*G06F 17/27* (2006.01)

(52) U.S. Cl.
CPC .... *G06F 17/3043* (2013.01); *G06F 17/30401* (2013.01); *G06F 17/2785* (2013.01)

(58) Field of Classification Search
None
See application file for complete search history.

(56) References Cited

U.S. PATENT DOCUMENTS

| 5,550,964 | A | 8/1996 | Davoust |
| 5,842,213 | A * | 11/1998 | Odom ............... G06F 17/30607 |
| 6,052,656 | A | 4/2000 | Suda et al. |
| 6,108,004 | A | 8/2000 | Medl |
| 6,199,034 | B1 | 3/2001 | Wical |
| 6,289,500 | B1 | 9/2001 | Baxter et al. |
| 6,424,973 | B1 | 7/2002 | Baclawski |
| 7,499,944 | B2 | 3/2009 | Higuchi |
| 7,502,779 | B2 | 3/2009 | Brockway et al. |
| 7,562,074 | B2 | 7/2009 | Liddell et al. |

(Continued)

FOREIGN PATENT DOCUMENTS

| EP | 2073131 A1 | 6/2009 |
| WO | 0046701 A1 | 8/2000 |

(Continued)

OTHER PUBLICATIONS

"The Chado Approach," Chapter 1. Introduction, retrieved from http://papio.biology.duke.edu/babase_chado_html/the-chado-approach.html on Jan. 8, 2015, 1 pp.

(Continued)

*Primary Examiner* — Son T Hoang
(74) *Attorney, Agent, or Firm* — Shumaker & Sieffert, P.A.

(57) ABSTRACT

Systems and methods may automate management of natural language queries of enterprise data. In one example, a method includes performing natural language processing and semantic processing on a natural language query to identify data sets relevant to the natural language query. The method further includes grouping the data sets into one or more query domains based at least in part on one or more relationships among the data sets. The method further includes prioritizing the query domain sets. The method further includes loading one or more of the query domain sets in an order based on the prioritizing of the query domain sets.

17 Claims, 10 Drawing Sheets

(56) References Cited

U.S. PATENT DOCUMENTS

| | | |
|---|---|---|
| 7,734,659 B2 | 6/2010 | Lori |
| 7,739,104 B2 | 6/2010 | Berkan et al. |
| 7,774,288 B2 | 8/2010 | Acharya et al. |
| 7,899,810 B2 | 3/2011 | Cambot et al. |
| 8,019,758 B2 | 9/2011 | Zheng et al. |
| 8,150,832 B2 | 4/2012 | Helfman |
| 8,175,911 B2 | 5/2012 | Cao et al. |
| 8,239,342 B2 | 8/2012 | Ross et al. |
| 8,266,148 B2 | 9/2012 | Guha et al. |
| 8,332,440 B2 | 12/2012 | Parker, III et al. |
| 8,452,804 B2 | 5/2013 | Bakalash et al. |
| 8,645,362 B1* | 2/2014 | Jain .................. G06F 17/30864 707/723 |
| 8,849,843 B1 | 9/2014 | George et al. |
| 8,977,953 B1 | 3/2015 | Pierre et al. |
| 8,996,555 B2 | 3/2015 | Kuchmann-Beauger et al. |
| 9,064,006 B2 | 6/2015 | Hakkani-Tur et al. |
| 2002/0016800 A1 | 2/2002 | Spivak et al. |
| 2003/0028541 A1 | 2/2003 | Bradley et al. |
| 2003/0088543 A1 | 5/2003 | Skeen et al. |
| 2003/0126147 A1 | 7/2003 | Essafi et al. |
| 2003/0221171 A1 | 11/2003 | Rust et al. |
| 2004/0024739 A1 | 2/2004 | Copperman et al. |
| 2005/0043940 A1 | 2/2005 | Elder |
| 2005/0278321 A1 | 12/2005 | Vailaya et al. |
| 2006/0024654 A1 | 2/2006 | Goodkovsky |
| 2006/0074980 A1 | 4/2006 | Sarkar |
| 2006/0106824 A1 | 5/2006 | Stuhec |
| 2006/0117002 A1* | 6/2006 | Swen .................. G06F 17/30707 |
| 2006/0179074 A1 | 8/2006 | Martin et al. |
| 2006/0288038 A1 | 12/2006 | Zheng et al. |
| 2007/0078889 A1 | 4/2007 | Hoskinson et al. |
| 2007/0088723 A1 | 4/2007 | Fish |
| 2007/0094060 A1 | 4/2007 | Apps et al. |
| 2007/0118551 A1 | 5/2007 | Akkiraju et al. |
| 2007/0174188 A1 | 7/2007 | Fish |
| 2008/0016039 A1 | 1/2008 | Brown et al. |
| 2008/0168135 A1 | 1/2008 | Redlich et al. |
| 2008/0059498 A1 | 3/2008 | Carus et al. |
| 2008/0097979 A1 | 4/2008 | Heidloff et al. |
| 2008/0189312 A1 | 8/2008 | Taranov et al. |
| 2008/0195604 A1 | 8/2008 | Sears |
| 2008/0270380 A1 | 10/2008 | Ohrn et al. |
| 2009/0125463 A1 | 5/2009 | Hido |
| 2009/0172035 A1 | 7/2009 | Lessing et al. |
| 2009/0222476 A1 | 9/2009 | Williamson |
| 2009/0254847 A1 | 10/2009 | Counts et al. |
| 2009/0265297 A1 | 10/2009 | Misra et al. |
| 2009/0319544 A1 | 12/2009 | Griffin et al. |
| 2009/0327240 A1 | 12/2009 | Meehan et al. |
| 2010/0049692 A1 | 2/2010 | Astito et al. |
| 2010/0049766 A1 | 2/2010 | Sweeney et al. |
| 2010/0082691 A1 | 4/2010 | Jaster et al. |
| 2010/0199223 A1 | 8/2010 | Colner |
| 2010/0202698 A1 | 8/2010 | Schmidtler et al. |
| 2010/0287014 A1 | 11/2010 | Gaulin et al. |
| 2010/0325206 A1 | 12/2010 | Dayal et al. |
| 2011/0040552 A1 | 2/2011 | Van Guilder et al. |
| 2011/0072021 A1 | 3/2011 | Lu et al. |
| 2011/0087629 A1 | 4/2011 | B'Far et al. |
| 2011/0093469 A1 | 4/2011 | B'Far et al. |
| 2011/0138312 A1 | 6/2011 | Yeh et al. |
| 2011/0153611 A1 | 6/2011 | Ankisettipalli et al. |
| 2011/0258202 A1 | 10/2011 | Mukherjee et al. |
| 2011/0307485 A1 | 12/2011 | Udupa et al. |
| 2011/0320396 A1 | 12/2011 | Hunt et al. |
| 2012/0078926 A1 | 3/2012 | Chu-Carroll et al. |
| 2012/0089636 A1 | 4/2012 | Qayyum et al. |
| 2012/0102032 A1 | 4/2012 | Bryne et al. |
| 2012/0143780 A1 | 6/2012 | Adendorff et al. |
| 2012/0154402 A1 | 6/2012 | Mital et al. |
| 2012/0179710 A1 | 7/2012 | Hanai |
| 2012/0197936 A1 | 8/2012 | Fuchs |
| 2012/0290561 A1 | 11/2012 | Kobayashi et al. |
| 2012/0310628 A1 | 12/2012 | Rathod et al. |
| 2013/0117253 A1 | 5/2013 | Wang et al. |
| 2013/0132365 A1 | 5/2013 | Chang et al. |
| 2013/0173507 A1 | 7/2013 | Chmiel et al. |
| 2013/0205190 A1 | 8/2013 | Kossmann et al. |
| 2013/0246430 A1 | 9/2013 | Szucs et al. |
| 2013/0268554 A1 | 10/2013 | Kokubu et al. |
| 2013/0300743 A1 | 11/2013 | Degrell et al. |
| 2014/0095145 A1 | 4/2014 | Assulin et al. |
| 2014/0114902 A1 | 4/2014 | McClung et al. |
| 2014/0164362 A1* | 6/2014 | Syed ................ G06F 17/30994 707/722 |
| 2014/0164379 A1 | 6/2014 | Jojgov et al. |
| 2014/0278364 A1 | 9/2014 | Grosset et al. |
| 2014/0279677 A1 | 9/2014 | Grosset et al. |
| 2014/0379755 A1 | 12/2014 | Kuriakose et al. |
| 2015/0006160 A1 | 1/2015 | Grosset et al. |
| 2015/0006432 A1 | 1/2015 | Grosset et al. |
| 2015/0032707 A1 | 1/2015 | Barykin et al. |
| 2015/0066945 A1 | 3/2015 | Crowe |
| 2015/0186776 A1 | 7/2015 | Peticlerc et al. |
| 2015/0186808 A1 | 7/2015 | Peticlerc et al. |
| 2015/0278198 A1* | 10/2015 | Andreev ........... G06F 17/30734 704/9 |
| 2015/0317374 A1 | 11/2015 | Petitclerc et al. |
| 2015/0317573 A1 | 11/2015 | Petitclerc et al. |
| 2015/0339369 A1 | 11/2015 | Rais-Ghasem et al. |

FOREIGN PATENT DOCUMENTS

| | | |
|---|---|---|
| WO | 2007005378 A1 | 1/2007 |
| WO | 2008100849 A2 | 8/2008 |
| WO | 2009094290 A2 | 7/2009 |
| WO | 2012085518 A1 | 6/2012 |

OTHER PUBLICATIONS

Han et al., "RDF123: a mechanism to transform spreadsheets to RDF," UMBC ebiquity, Aug. 26, 2007, 19 pp.

Syed et al., "Exploiting a Web of Semantic Data for Interpreting Tables," UMBC ebiquity, Second Web Science Conference, Apr. 26-27, 2010, 8 pp.

U.S. Appl. No. 14/141,950, by Martin Petitclerc et al., filed Dec. 27, 2013.

U.S. Appl. No. 14/266,497, by Martin Petitclerc et al., filed Apr. 30, 2014.

U.S. Appl. No. 14/285,269, by Mohsen M. Rais-Ghasem et al., filed May 22, 2014.

Fileto et al., "Baquara: A Holistic Ontological Framework for Movement Analysis using Linked Data," adfa, 2011. Springer-Verlag Berlin Heidelberg 2011, pp. 1-14.

"List of IBM Patents or Patent Applications Treated as Related," Appendix P, dated Oct. 5, 2015, 2 pp.

Fei Li et al., "Constructing an Interactive Natural Language Interface for Relational Databases," Proceedings of the VLDB Endowment, vol. 8, No. 1, Sep. 1, 2014, 12 pp.

Rukshan Alexander et al., "Natural Language Web Interface for Database (NLWIDB)," Proceedings of the Third International Symposium, SEUSL: Jul. 6-7, 2013, 8 pp.

"Automated Ontological Mapping for Metadata", IP.com Disclosure No. IPCOM000191276D, Dec. 24, 2009, 2 pgs.

"Method and System for Automatically Determining Hierarchies/Relationships from a Data Set for Generating Data Model," IP.com Prior Art Database Technical Disclosure: IPCOM000202401D, Dec. 15, 2010, 5 pp.

"Method and System for Dynamically Creating Business Intelligence Reports and Dashboards based on User Inputs," IP.com Prior Art Database Technical Disclosure: IPCOM000202424D, Dec. 15, 2010, 6 pp.

"Method for Determining Explanatory Factors for a Selection of Aggregated Data," IP.com Prior Art Database Technical Disclosure: IPCOM000225183D. Jan. 29, 2013, 6 pp.

Cao et al. "Ontology-Based Integration of Business Intelligence", 2006, 13 pgs.

(56) References Cited

OTHER PUBLICATIONS

Cheng et al. "An Ontology-Based Business Intelligence Application in a Financial Knowledge Management System," Expert Systems with Applications, Elsevier Ltd., Mar. 4, 2008, 9 pp.
Egozi et al., "Concept-Based Information Retrieval using Explicit Semantic Analysis," ACM Transactions on Information Systems, vol. 29, No. 2, Apr. 2011, 38 pp.
Hofmann, "Latent Semantic Models for Collaborative Filtering," ACM Transactions on Information Systems, vol. 22, No. 1, Jan. 2004, 27 pp.
Kishore et al., "Probabilistic Semantic Web Mining Using Artificial Neural Analysis," International Journal of Computer Science and Information Security, vol. 7, No. 3, Mar. 2010, 11 pp.
Mustapha et al. "Knowledge Harvesting for Business Intelligence", Second European Business Intelligence Summer School (eBISS 2012), Jul. 15-21, 2012, Brussels, Belgium, 144 pgs.
Neumayr et al. "Semantic Cockpit: An Ontology-driven. Interactive BI Tool for Comparative Data Analysis," The 1st International Workshop on Modeling and Reasoning for Business Intelligence (MoRe-BI 2011 ), Oct. 31, 2011, 20 pp.
Rais-Ghasem et al., "Towards Semantic Data Analysis," IBM Canada Ltd., Nov. 18-20, 2013, 8 pp.
Saggion et al., "Ontology-based Information Extraction for Business Intelligence," Proceedings of the 6th International Semantic Web Conference, ISWC'07/ASWC'07, Nov. 11, 2007, 14 pp.
Sell et al., "SBI: A Semantic Framework to Support Business Intelligence," OBI'08, Oct. 2008, 11 pp.
Van Ham et al., "Guiding Multidimensional Analysis Using Decision Trees," IBM Canada Ltd., Proceedings of the 2013 Conference of the Center for Advanced Studies on Collaborative Research, Nov. 18, 2013, 15 pp.
Zarandi, "A Retail Ontology: Formal Semantics and Efficient Implementation," University of Toronto, Master of Science Thesis, 2007, 180 pp.
Rais-Ghasem et al., "Towards Semantic Data Analysis," GASCON 2013, Nov. 18-20, 213, IBM Canada Ltd., 2013, 12 pp.
"List of IBM Patents or Patent Applications Treated as Related," Appendix P, 2 pp.
U.S. Appl. No. 14/610,812, filed Jan. 30, 2015 by Mohsen Rais-Ghasem et al.
U.S. Appl. No. 15/055,382, filed Feb. 26, 2016 by Mohsen Rais-Ghasem et al.
Preliminary Amendment from U.S. Appl. No. 14/610,812, filed Feb. 19, 2016.
"List of IBM Applications treated as related," Appendix P, 2 pgs.

* cited by examiner

AUTOMATED MANAGEMENT OF NATURAL LANGUAGE QUERIES IN ENTERPRISE BUSINESS INTELLIGENCE ANALYTICS

TECHNICAL FIELD

This disclosure relates to business intelligence systems, and more particularly, to business intelligence analytics systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by many users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

Business intelligence (BI) systems may include analytics systems that may provide insights into collections of enterprise data. An analytics system may be used to explore data, determine cause and effect relationships among data, formulate predictions based on existing data, and support decision-making, for example. An analytics system may include a variety of tools and capabilities for visualizing, analyzing, and exploring enterprise data.

SUMMARY

In one aspect of the invention, a method includes performing natural language processing and semantic processing on a natural language query to identify data sets relevant to the natural language query. The method further includes grouping the data sets into one or more query domains based at least in part on one or more relationships among the data sets. The method further includes prioritizing the query domain sets. The method further includes loading one or more of the query domain sets in an order based on the prioritizing of the query domain sets.

In another aspect, a computer program product includes a computer-readable storage medium having program code embodied therewith. The program code is executable by a computing device to perform natural language processing and semantic processing on a natural language query to identify data sets relevant to the natural language query. The program code is further executable by a computing device to group the data sets into one or more query domains based at least in part on one or more relationships among the data sets. The program code is further executable by a computing device to prioritize the query domain sets. The program code is further executable by a computing device to load one or more of the query domain sets in an order based on the prioritizing of the query domain sets.

In another aspect, a computer system includes one or more processors, one or more computer-readable memories, and one or more computer-readable, tangible storage devices. The computer system further includes program instructions, stored on at least one of the one or more storage devices for execution by at least one of the one or more processors via at least one of the one or more memories, to perform natural language processing and semantic processing on a natural language query to identify data sets relevant to the natural language query. The computer system further includes program instructions, stored on at least one of the one or more storage devices for execution by at least one of the one or more processors via at least one of the one or more memories, to group the data sets into one or more query domains based at least in part on one or more relationships among the data sets. The computer system further includes program instructions, stored on at least one of the one or more storage devices for execution by at least one of the one or more processors via at least one of the one or more memories, to prioritize the query domain sets. The computer system further includes program instructions, stored on at least one of the one or more storage devices for execution by at least one of the one or more processors via at least one of the one or more memories, to load one or more of the query domain sets in an order based on the prioritizing of the query domain sets.

The details of one or more embodiments of the invention are set forth in the accompanying drawings and the description below. Other features, objects, and advantages of the invention will be apparent from the description and drawings, and from the claims.

DETAILED DESCRIPTION

Various examples are disclosed herein for a business intelligence (BI) analytics system that enables natural language queries and performs automated partitioning, filtering, and management of the queries and the responsive retrieval of data from enterprise data sources. BI analytics systems typically include large, enterprise-scale BI applications that require substantial upfront work by database experts to get up and running before client applications are customized to the particular business and its BI reporting requirements, and ready for business users to use. For example, the enterprise's database experts may build a BI sematic model that describes enterprise data stores in business terms and conforms to current BI reporting requirements required by various business users, and which may change over time. The database experts may also be required to build the BI semantic model to deal with ambiguous table joins and common SQL traps such as "chasm" and "fan" traps. The BI semantic model may enable the BI client application to be used by business users to visualize and perform analytics on enterprise data. The business users may also regularly give feedback to the BI technical staff on new changes in BI reporting requirements, and wait for the technical staff to modify the enterprise BI semantic model or other parts of the BI applications to conform to the new changes or reporting requirements. The initial preparation and subsequent ongoing modifications of the BI applications tend to be time-consuming and expensive.

In various examples of this disclosure, a system may instead enable business users who are knowledgeable in their specific business and its metrics but have little or no knowledge of database design or query languages such as SQL, to pose queries in natural language, that result in the system retrieving and presenting data from the enterprise's data sources based on the natural language queries. Implementations of this disclosure may thus enable business users to query enterprise data sources simply with natural language queries, and receive data responsive to the natural language queries in a BI client application for data exploration and analytics. Implementations of this disclosure may also perform automated technical management of the data queries and retrievals "under the hood" to compensate for lack of fine-grained query construction in the natural language queries compared with queries constructed in a database query language such as SQL. For example, an implementation of this disclosure may provide business user-friendly guidance and feedback on data management, apply automatic partitioning and filtering to executed queries based on a natural language query input, and perform intelligent management of upload times and segmentation and ranked prioritization of uploaded portions of large bodies of enterprise data responsive to the queries, as further described below.

Figure 1:
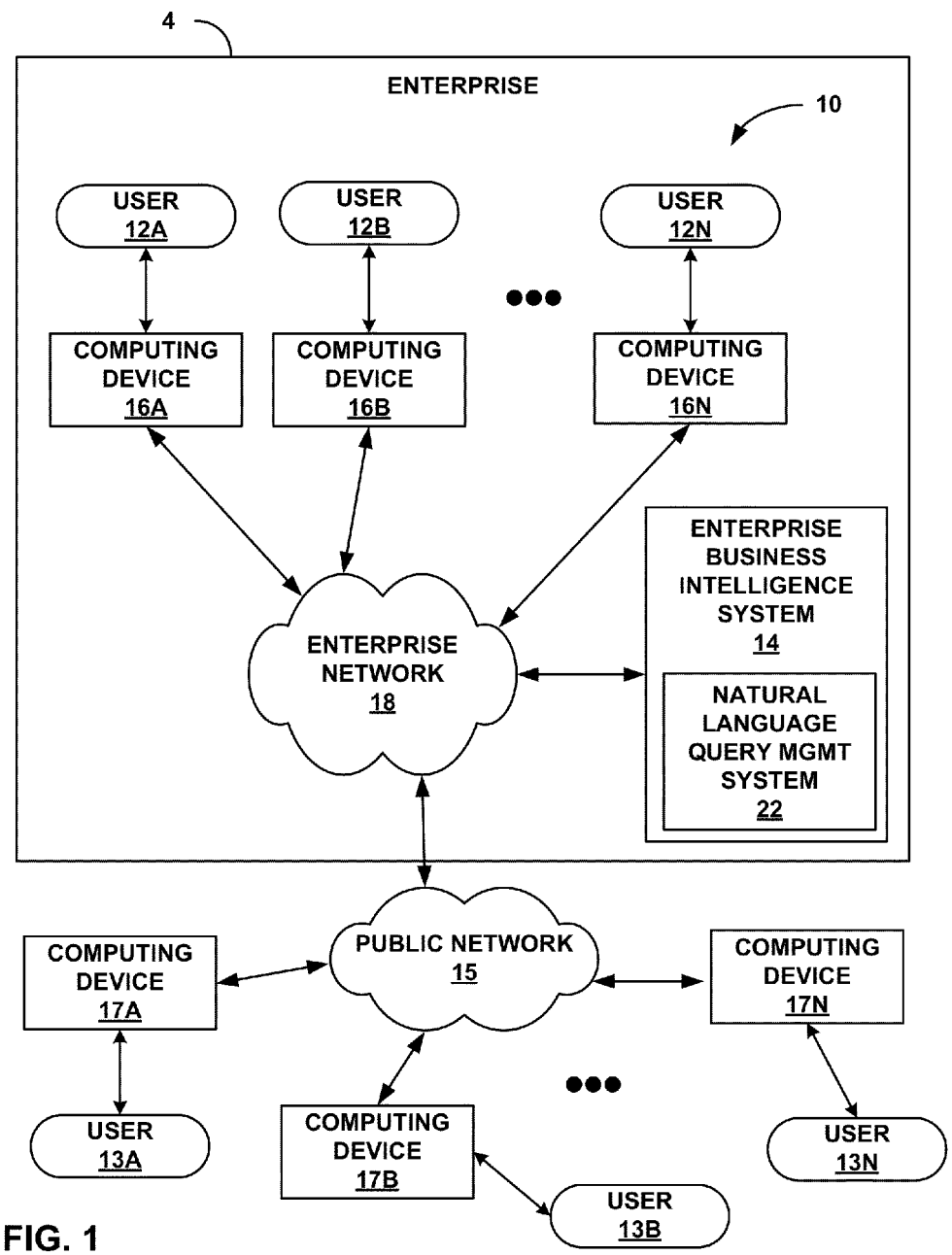
FIG. 1 shows a block diagram illustrating an example enterprise software system that may perform natural language query management, in one aspect of this disclosure.

FIG. 1 shows a block diagram illustrating an example enterprise software system that may perform natural language query management, in one aspect of this disclosure. FIG. 1 illustrates an example context in which a natural language query management system 22 of this disclosure may be implemented and used. FIG. 1 is a block diagram illustrating an example enterprise 4 having a computing environment 10 in which a plurality of users 12A-12N within enterprise 4 (collectively, "enterprise users 12" or "users 12") may interact with an enterprise business intelligence (BI) system 14 that includes a natural language query management system 22, as described further below. In the system shown in FIG. 1, enterprise business intelligence system 14 is communicatively coupled to a number of client computing devices 16A-16N (collectively, "client computing devices 16" or "computing devices 16") by an enterprise network 18. Users 12 interact with their respective computing devices 16 to access enterprise business intelligence system 14. Users 12, computing devices 16, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In this example, enterprise BI system 14 includes servers that run BI dashboard web applications and may provide business analytics software. A user 12 may use a BI portal on a client computing device 16 to view and manipulate information such as business intelligence reports ("BI reports") and other collections and visualizations of data via their respective computing devices 16. This may include data from any of a wide variety of sources, including from multidimensional data structures and relational databases within enterprise 4, as well as data from a variety of external sources that may be accessible over public network 15, including external client computing devices 17A-17N (collectively, "external client computing devices 17" or "computing devices 17") used by external users 13A-13N ("external users 13"). In some examples, enterprise 4 may thus make natural language query management system 22 available to any of enterprise users 12 or external users 13.

Users 12, 13 may use a variety of different types of computing devices 16, 17 to interact with enterprise business intelligence system 14 and access data visualization tools and other resources via enterprise network 18. For example, an enterprise user 12 may interact with enterprise business intelligence system 14 and run a business intelligence (BI) portal (e.g., a business intelligence dashboard, etc.) using a laptop computer, a desktop computer, or the like, which may run a web browser. Alternatively, an enterprise user may use a smartphone, tablet computer, or similar device, running a business intelligence dashboard in a web browser, a dedicated mobile application, or other means for interacting with enterprise business intelligence system 14. An external user 13 may also access natural language query management system 22 via a smartphone, tablet computer, or similar device, running a business intelligence dashboard in a web browser, a dedicated mobile application, or other means for interacting with certain externally surfaced functions of enterprise business intelligence system 14.

Enterprise network 18 and public network 15 may represent any communication networks, and may include a packet-based digital network such as a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
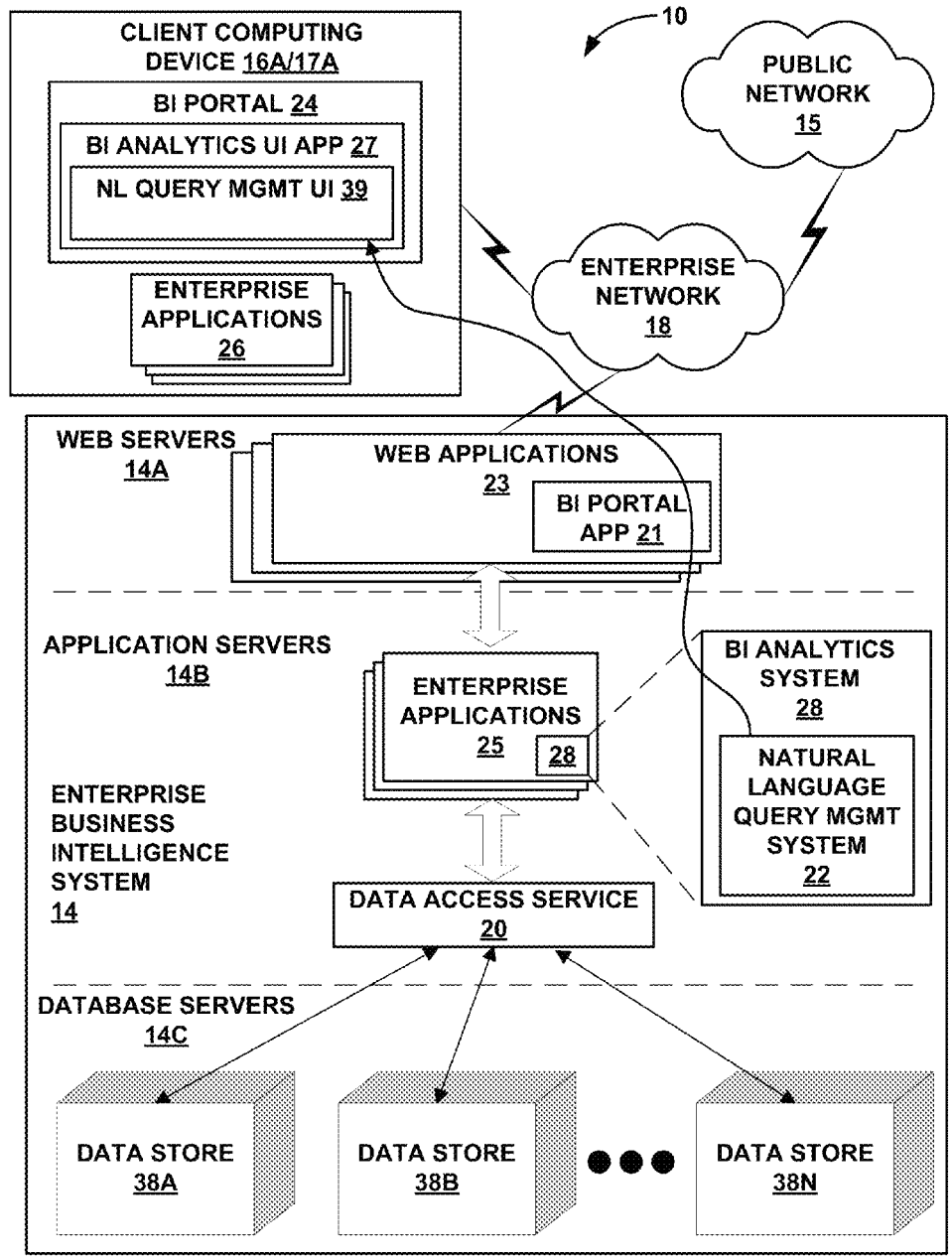
FIG. 2 shows a conceptual block diagram illustrating in further detail portions of one embodiment of enterprise business intelligence (BI) computing environment that includes a BI analytics system comprising a natural language query management system as part of an enterprise BI computing system, in one aspect of this disclosure.

FIG. 2 shows a conceptual block diagram illustrating in further detail portions of one embodiment of enterprise business intelligence (BI) computing environment 10 that includes a BI analytics system 28 comprising natural language query management system 22 as part of an enterprise BI computing system 14, in one aspect of this disclosure. In this example implementation, a single client computing device 16A is shown for purposes of example and includes a BI portal 24 and one or more client-side enterprise software applications 26 that may utilize and manipulate data, including to view analytics tools and data visualizations with BI portal 24. BI portal 24 may be rendered within a general web browser application, within a locally hosted application or mobile application, or other user interface. BI portal 24 may be generated or rendered using any combination of application software and data local to the computing device it's being generated on, and/or remotely hosted in one or more application servers or other remote resources.

BI portal 24 may include a BI analytics application user interface (UI) 27 that may interact with an enterprise BI analytics system 28 implemented on enterprise BI system 14, where BI analytics system 28 includes natural language query management system 22. BI analytics system 28 configured with natural language query management system 22 may perform automated management of natural language queries of enterprise data, as further described below. Natural language query management system 22 may thereby enable BI analytics system 28 and/or BI analytics application UI 27 to implement a natural language query management user interface (UI) 39 on client computing device 16A, as further described below.

BI portal 24 may enable a user to enter queries in natural language rather than, e.g., in the form of structured queries in a query language such as SQL. Natural language query management UI 39 may also present guidance and feedback to the user to assist the user in understanding sizes and load times of data sets responsive to a natural language query, and in filtering and prioritizing partitioned segments of data responsive to a natural language query, as further described below. Natural language query management UI 39 of BI portal 24 may then present visualizations or representations of data based on enterprise data retrieved and loaded from enterprise data stores 38 via natural language query management system 22.

FIG. 2 depicts additional detail for enterprise business intelligence system 14 and how it may be accessed via interaction with a BI portal 24 for depicting and providing visualizations of business data. BI portal 24 may provide visualizations of data that represents, provides data from, or links to any of a variety of types of resource, such as a BI report, a software application, a database, a spreadsheet, a data structure, a flat file, Extensible Markup Language ("XML") data, a comma separated values (CSV) file, a data stream, unorganized text or data, or other type of file or resource. BI portal 24 may also provide visualizations of data based on natural language queries and follow-up filtering or prioritizing implemented by natural language query management system 22.

Natural language query management system 22 may be hosted among enterprise applications 25, as in the example depicted in FIG. 2, or may be hosted elsewhere, including on a client computing device 16A/17A (which may be a client computing device 16A internal to enterprise computing environment 10 or a client computing device 17A external to enterprise computing environment 10 in different examples), or distributed among various computing resources in enterprise business intelligence system 14, in some examples. Natural language query management system 22 may be implemented as or take the form of a stand-alone application, a portion or add-on of a larger application, a library of application code, a collection of multiple applications and/or portions of applications, or other forms, and may be executed by any one or more servers, client computing devices, processors or processing units, or other types of computing devices.

As depicted in FIG. 2, enterprise business intelligence system 14 is implemented in accordance with a three-tier architecture: (1) one or more web servers 14A that provide web applications 23 with user interface functions, including a server-side BI portal application 21; (2) one or more application servers 14B that provide an operating environment for enterprise software applications 25 and a data access service 20; and (3) database servers 14C that provide one or more data sources 38A, 38B, . . . , 38N ("data sources 38"). Enterprise software applications 25 may include natural language query management system 22 as one of enterprise software applications 25 or as a portion or portions of one or more of enterprise software applications 25.

The data sources 38 may include two-dimensional databases and/or multidimensional databases or data cubes. The data sources may be implemented using a variety of vendor platforms, and may be distributed throughout the enterprise. As one example, the data sources 38 may be multidimensional databases configured for Online Analytical Processing (OLAP). As another example, the data sources 38 may be multidimensional databases configured to receive and execute Multidimensional Expression (MDX) queries of some arbitrary level of complexity. As yet another example, the data sources 38 may be two-dimensional relational databases configured to receive and execute SQL queries, also with an arbitrary level of complexity. Data sources 38 may also include one or more sets of cross sectional data, for example.

Multidimensional data structures are "multidimensional" in that each multidimensional data element is defined by a plurality of different object types, where each object is associated with a different dimension. The enterprise applications 26 on client computing device 16A may issue business queries to enterprise business intelligence system 14 to build reports. Enterprise business intelligence system 14 includes a data access service 20 that provides a logical interface to the data sources 38. Client computing device 16A may transmit query requests through enterprise network 18 to data access service 20. Data access service 20 may, for example, execute on the application servers intermediate to the enterprise software applications 25 and the underlying data sources in database servers 14C. Data access service 20 retrieves a query result set from the underlying data sources, in accordance with query specifications. Data access service 20 may intercept or receive queries, e.g., by way of an API presented to enterprise applications 26. Data access service 20 may then return this result set to enterprise applications 26 as BI reports, other BI objects, and/or other sources of data that are made accessible to BI portal 24 on client computing device 16A. These may include graphical representations of data responsive to natural language queries entered and modified via natural language query management system 22.

As described above and further below, natural language query management system 22 may be implemented in one or more computing devices, and may involve one or more applications or other software modules that may be executed on one or more processors. Example embodiments of the present disclosure may illustratively be described in terms of the example of natural language query management system 22 in various examples described below.

Figure 3:
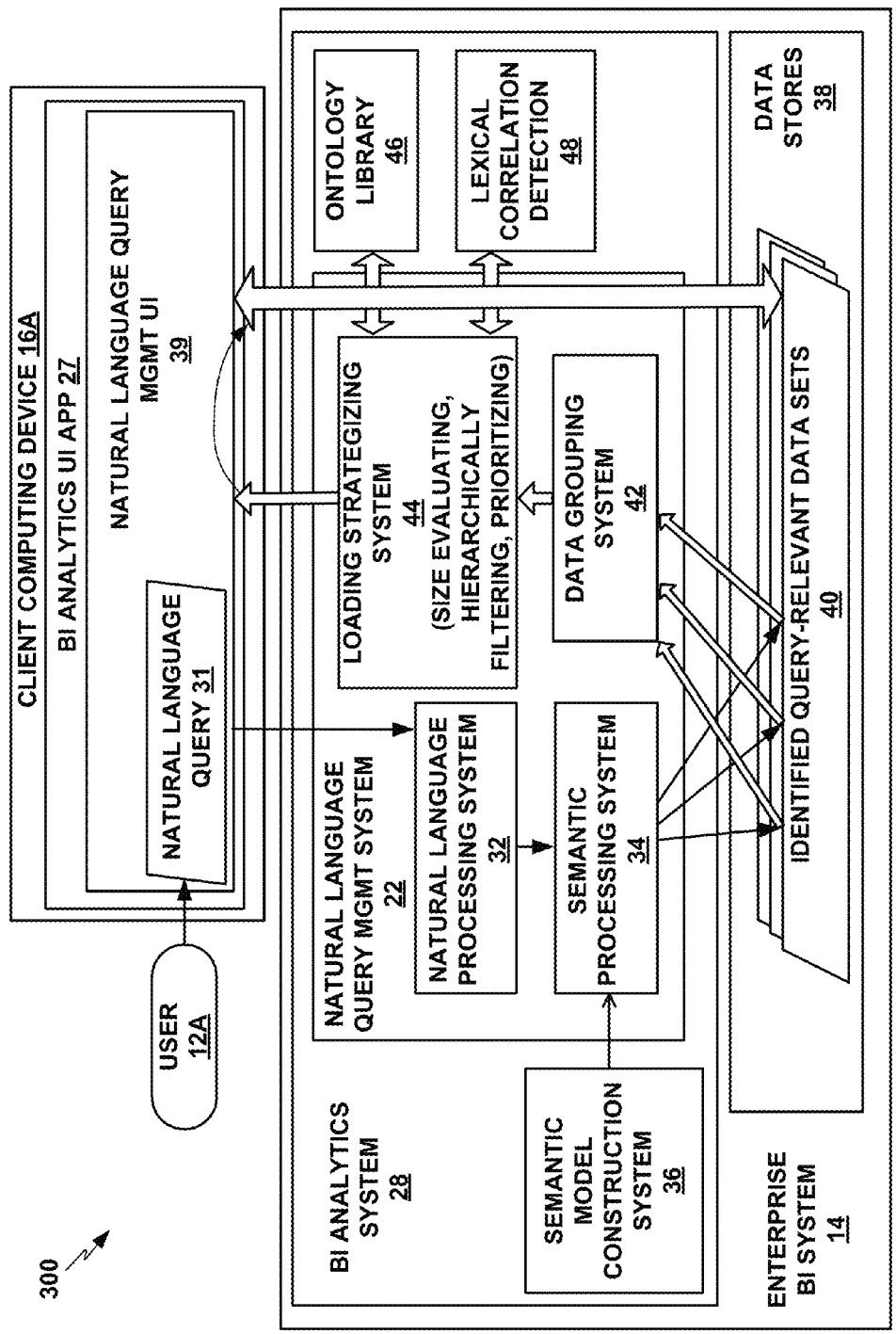
FIG. 3 shows a conceptual diagram of an example enterprise computing environment including a natural language query management system that enables structured queries and managed retrieval of enterprise data using natural language inputs in a BI client application, in an aspect of this disclosure.

FIG. 3 shows a conceptual diagram of an example enterprise computing environment 300 including natural language query management system 22 that enables structured queries and managed retrieval of enterprise data using natural language inputs in a BI client application, in an aspect of this disclosure. A business user 12A may (e.g., by spoken word or keyboard input) pose a question in natural language, such as "What are our sales by geography and products over time," into natural language query management UI 39 in BI analytics UI application 27. Natural language query management UI 39 may communicate the natural language query 31 to natural language query management system 22. Natural language query management system 22 may perform processing of the natural language query 31 with a natural language processing (NLP) system 32 and a semantic processing system 34.

NLP system 32 may parse natural language query 31 into a machine-readable representation of the query. Semantic processing system 34 may use or incorporate a semantic model based on a semantic model construction system 36, and which may provide rich associations with the data in data stores 38 for the enterprise and its structures and functions, as may be referenced in natural language queries. Natural language query management system 22 may thus identify columns and tables of data in data stores 38 that are relevant to the given natural language query 31. These identified query-relevant data sets 40 identified by natural language query management system 22 from among data stores 38 may be referred to as context columns and context tables, or more generally as context objects or simply data sets.

Natural language query management system 22 may then further process or index the context objects of query-relevant data sets 40 by applying a data grouping system 42 to group together data tables that are referenced by the context objects. Data grouping system 42 may perform automated grouping of tables by following the relationships between the tables and using the cardinality of the relationship ends to determine direction. Data grouping system 42 may group the tables into "query domains" where each query domain contains a potential "fact table" or table with a highest cardinality, and a collection of attribute tables which are tables related to the fact table in a many-to-one cardinality.

Natural language query management system 22 also includes a loading strategizing system 44. Loading strategizing system 44 may process each of one or more data query domains processed by data grouping system 42 to determine distinct value counts or estimated sizes of the data query domains, determine estimated total load times of the query domains, determine possible hierarchies in the data in the query domains, and derive a reasonable data chunking or segmenting strategy to enable loading the data of the query domains incrementally to the client device natural language query management UI 39, with the most relevant chunk or segment of data first, and subsequent segments of data in descending order of determined relevance.

Loading strategizing system 44 may have operable access to additional features that may contribute to enabling loading strategizing system 44 to detect hierarchical relationships in the data query domains, such as a concept ontology library 46 and a lexical correlation detection system 48. Ontology library 46 and a lexical correlation detection system 48 may also be available to semantic model construction system 36 (relationship not shown in FIG. 3) to contribute to building or updating a semantic model accessible to semantic processing system 34 for semantically parsing natural language queries. Natural language processing system 32, semantic processing system 34, data grouping system 42, loading strategizing system 44, and other features depicted in FIG. 3 may each be or include software components, applications, modules, libraries, or other organized portions of executable instruction software code, or any other type of component that implements the functions ascribed thereto, in various examples.

Loading strategizing system 44 may thus begin delivering data responsive to the natural language query 31 to the natural language query management UI 39. Loading strategizing system 44 may also deliver guidance, feedback, and data filtering options to natural language query management UI 39, such as an estimated total size of data identified as being responsive to the natural language query, an estimated total load time of data identified as being responsive to the natural language query, and filter options on one or more identified hierarchical data query definitions, enabling the user to narrow the scope of the query and thus reduce the load time for the data the user deems most important. Various aspects of the example of FIG. 3 are further described below with reference to the subsequent figures.

Figure 4:
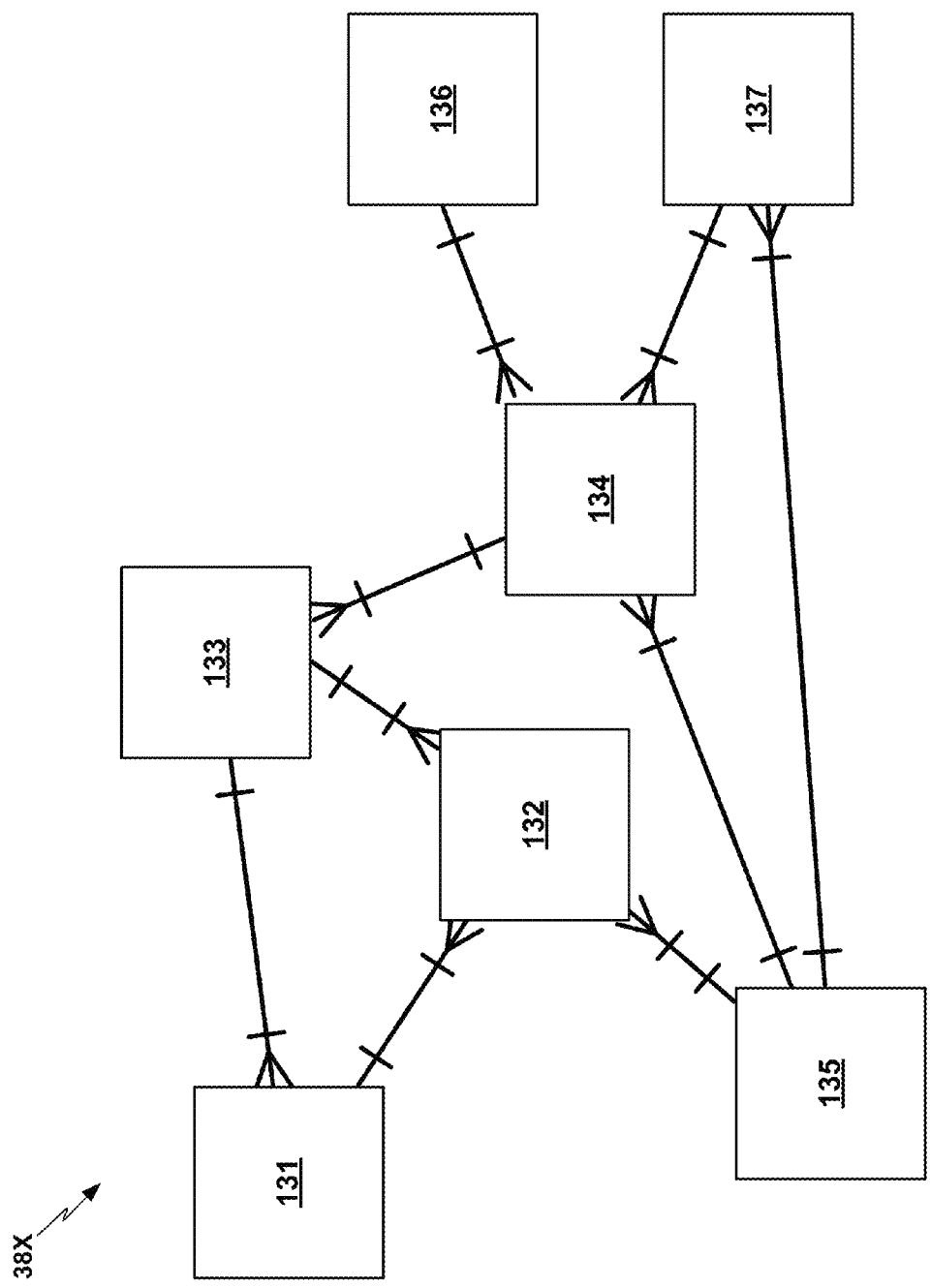
FIG. 4 depicts a data collection that includes a number of data tables as they may be initially identified as part of a query execution process by a natural language query management system among data stores, in an aspect of this disclosure.

FIG. 4 depicts a data collection 38X that includes a number of data tables 131, 132, 133, 134, 135, 136, 137 ("data tables 131-137") as they may be initially identified as part of a query execution process by natural language query management system 22 among data stores 38. In particular, natural language query management system 22 may identify data tables 131-137 as relevant to an NLP and semantically processed form of the natural language query, "What are our sales by geography and products over time." Natural language query management system 22 may identify data tables 131-137 either by name (e.g., by lexical correlation of column headers or table names in the data tables with parsed terms in the natural language query) or by ontological concept (e.g., general ontological concepts such as time or geography, or business-related ontological concepts that may be specifically defined for the particular enterprise such as products or employees, and which may not have an exact lexical match in the column headers or table names of data tables 131-137). Data collection 38X may be a total collection of all available data columns or tables found to be relevant to the natural language query. This set of tables and columns matching the query criteria may also be referred to as "context objects".

Data tables 131-137 may be from relational databases and other data sources implemented in a star schema that includes tables and columns or, generally speaking, entities and attributes. Data tables 131-137 have many relationships to each other, such as by either exported key relationships or other ways depending on the data source implementation or vendor. The relationships shown in FIG. 4 are all join relationships depicted in cross-feet notation. In some cases more than one relationship may exist between the same tables, and circular relationships exist among some sets of the tables. The actual relationships that apply when executing a particular natural language query (analogous to a SQL statement) may depend on the context of the query.

In order to determine what relations are needed to execute a query that references columns from tables 131, 132, 133, and 135, there are several possible join relationship paths from which natural language query management system 22 may select. In order to decide which joins to use, natural language query management system 22 may evaluate how the data columns will be used. For example, natural language query management system 22 may evaluate which columns represent facts and which represent attributes, and may evaluate whether the data can be represented as a hierarchy.

Figure 5:
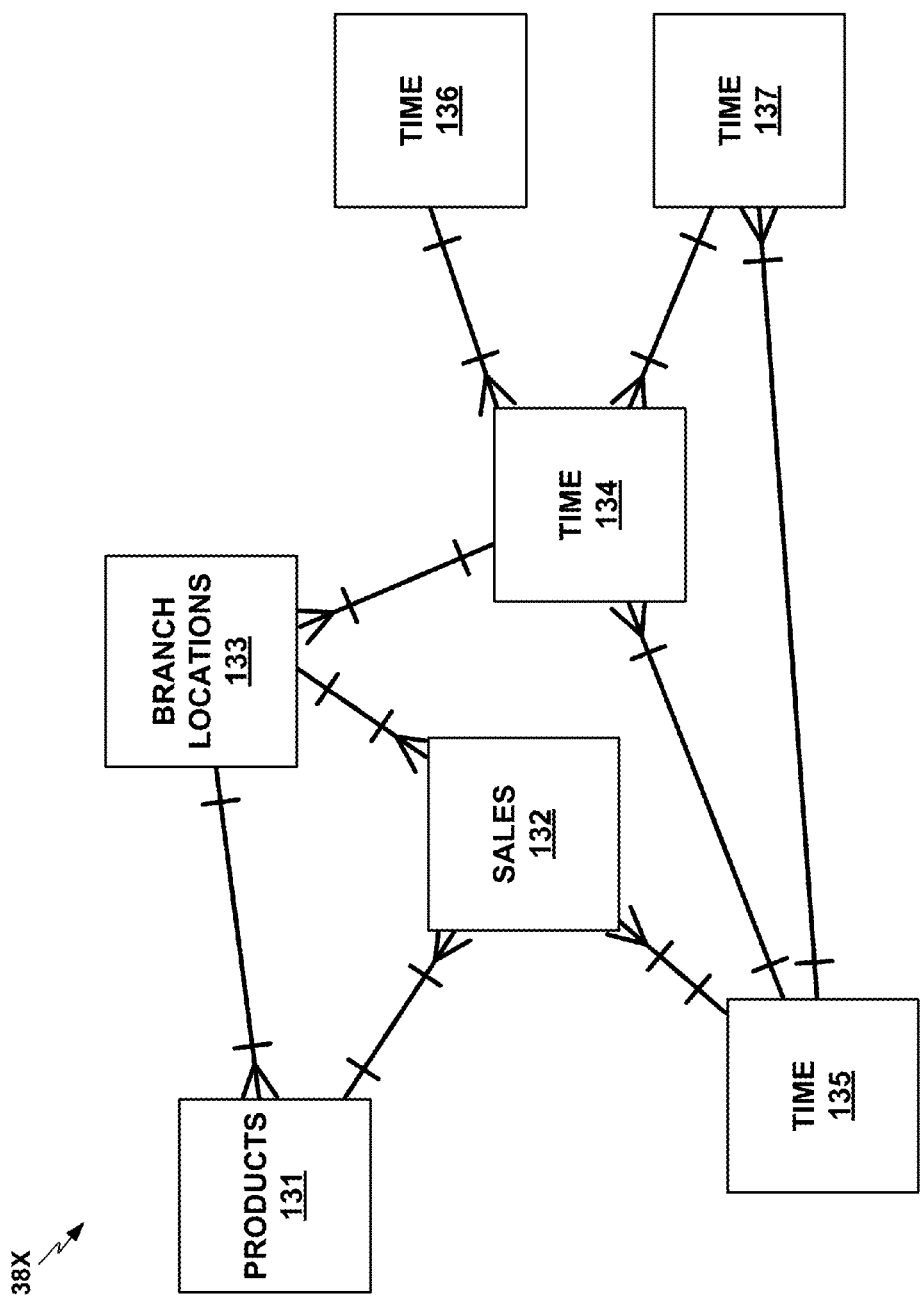
FIG. 5 depicts data collection with query-relevant data tables and with primary ontological concept identifications for each table determined by natural language query management system, in an aspect of this disclosure.

FIG. 5 depicts data collection 38X with query-relevant data tables 131-137 and with primary ontological concept identifications for each table determined by natural language query management system 22. Tables 131, 132, and 133 are identified with the concepts of "products," "sales," and "branch locations," respectively, while tables 134-137 all primarily match the concept of "time." Natural language query management system 22 may determine that all of these tables thus match one of the concepts in the natural language query. Natural language query management system 22 may also determine a context in which each of the tables may be used based on the structure of relationships among the concepts in the natural language query, or how the natural language query was worded.

In particular, natural language query management system 22 may determine by parsing the natural language query 31 that "sales" is a "fact" or measure, and that products, branch location, and time are attributes of that fact. Natural language query management system 22 may further determine based on database design principle that facts are likely to have many-to-one relationships to attributes. Natural language query management system 22 may thus determine or confirm that table 135 is the appropriate time table to apply to the sales table 132, and that the one-to-many relationships that sales table 132 has with time table 135, products table 131, and branch locations table 133 are the most relevant relationships to use for data responsive to the natural language query 31. Natural language query management system 22 may be configured to identify one-to-many relationships with the applicable fact table, in this case the sales table 132, as the applicable cardinality to indicate applicability for the query results. Natural language query management system 22 may also be configured to select tables only in one direction from the applicable fact table and thus to avoid cross-joins or double counting in the tables used for the results for the natural language query.

Once natural language query management system 22 has identified the applicable tables, columns and relationships that are indicated to potentially lead to relevant data responsive to the natural language query, natural language query management system 22 may be configured to store references or indexes to those tables, columns, and relationships in one or more query result indexes that may be referred to as "query domains." The total potentially relevant results identified by natural language query management system 22 among enterprise data sources 38 may typically often include more than one query domain.

In some cases, natural language query management system 22 may identify more than one likely relevant fact table, as opposed to just the one identified relevant fact table of the "sales" table 132 in the example of FIGS. 4 and 5. An example with multiple likely relevant fact tables is shown in FIG. 6.

Figure 6:
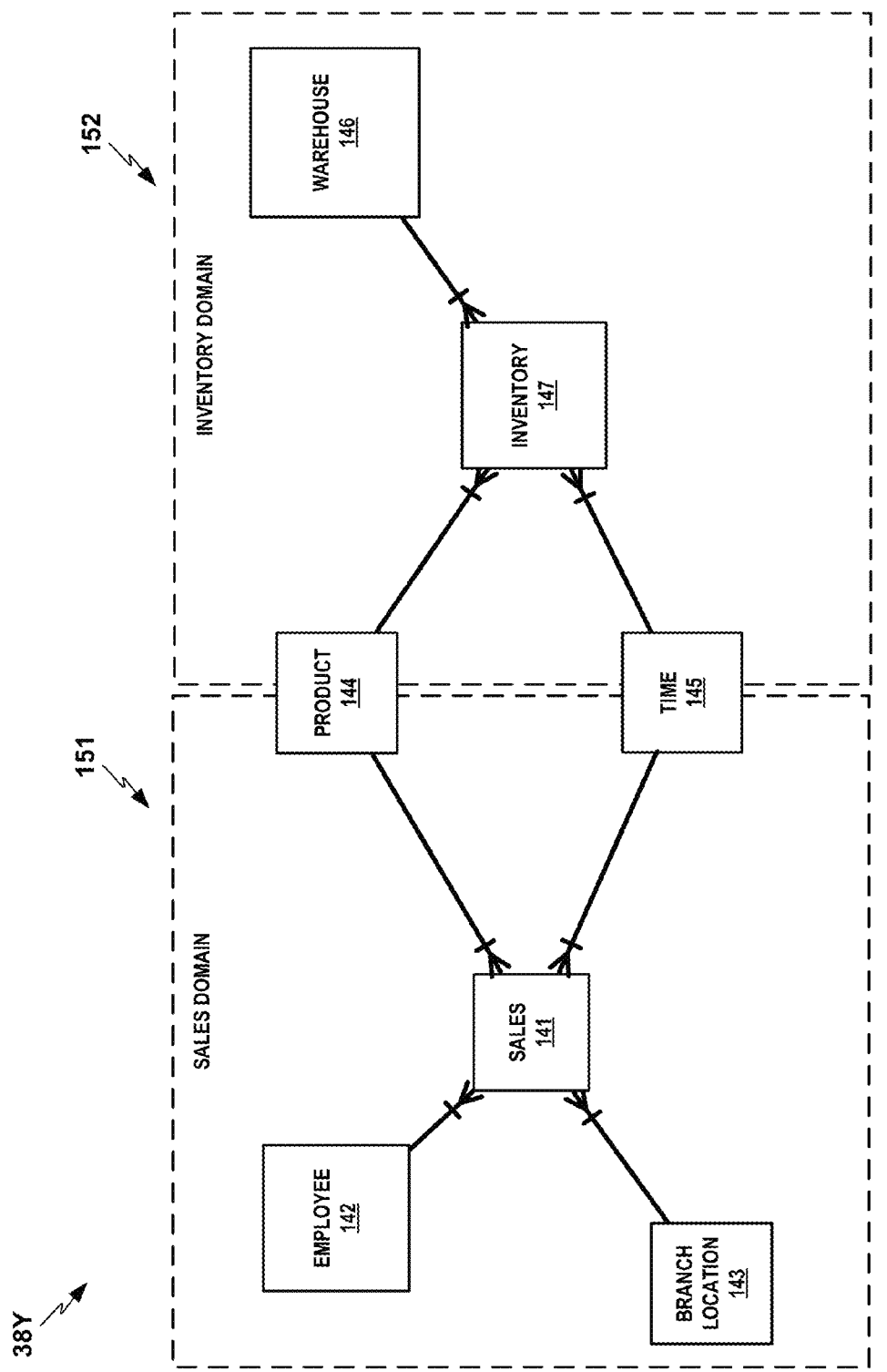
FIG. 6 shows a data collection that includes a number of data tables as they may be initially identified as part of a different example query execution process by a natural language query management system among data stores, in an aspect of this disclosure.

FIG. 6 shows a data collection 38Y that includes a number of data tables 141, 142, 143, 144, 145, 146, 147 ("data tables 141-147") as they may be initially identified as part of a different example query execution process by natural language query management system 22 among data stores 38, responsive to a different natural language query in which a user merely recites, "show me products over time." In this example, natural language query management system 22 may determine from the relationship cardinalities, or the one-to-many relationships among data tables 141-147, that there is more than one fact table, and that sales table 141 and inventory table 147 are both fact tables. In other words, sales table 141 is in one-to-many relationships (respectively) with each of tables 142-145, and inventory table 147 is in one-to-many relationships (respectively) with each of tables 144-146, while no other tables have a one-to-many relationship (respectively) with either of sales table 141 or inventory table 147.

Natural language query management system 22 may also determine that none of the only two concepts identified in the natural language query (via NLP and semantic processing) correspond with any of the extant fact tables as defined by the relationship cardinalities. Natural language query management system 22 may instead determine that each of the only two concepts identified in the natural language query are in many-to-one relationship (respectively) with each of the fact tables in data collection 38Y, i.e., sales table 141 and inventory table 147. In this situation, natural language query management system 22 may seek to identify fact tables relevant to the concepts identified from the natural language query, and identify and index query domains applicable to those fact tables. In this case, natural language query management system 22 may identify the sales table 141 and the inventory table 147 as the fact tables relevant to the product table 144 and the time table 145 that match the concepts identified from the natural language query, and then determine all the tables with which each of the two fact tables has one-to-many (respectively) cardinality relationships, as the span of respective query domains to be defined to correspond to the fact tables. In this example, natural language query management system 22 may identify sales table 141 as having one-to-many relationships with tables 142-145, and inventory table 147 as having one-to-many relationships with tables 144-146. Thus, natural language query management system 22 may identify tables 141-145 as belonging to a sales query domain 151 that natural language query management system 22 may determine corresponds to sales table 141, and natural language query management system 22 may identify tables 144-147 as belonging to an inventory query domain 152 that natural language query management system 22 may determine corresponds to inventory table 147.

Figure 7:
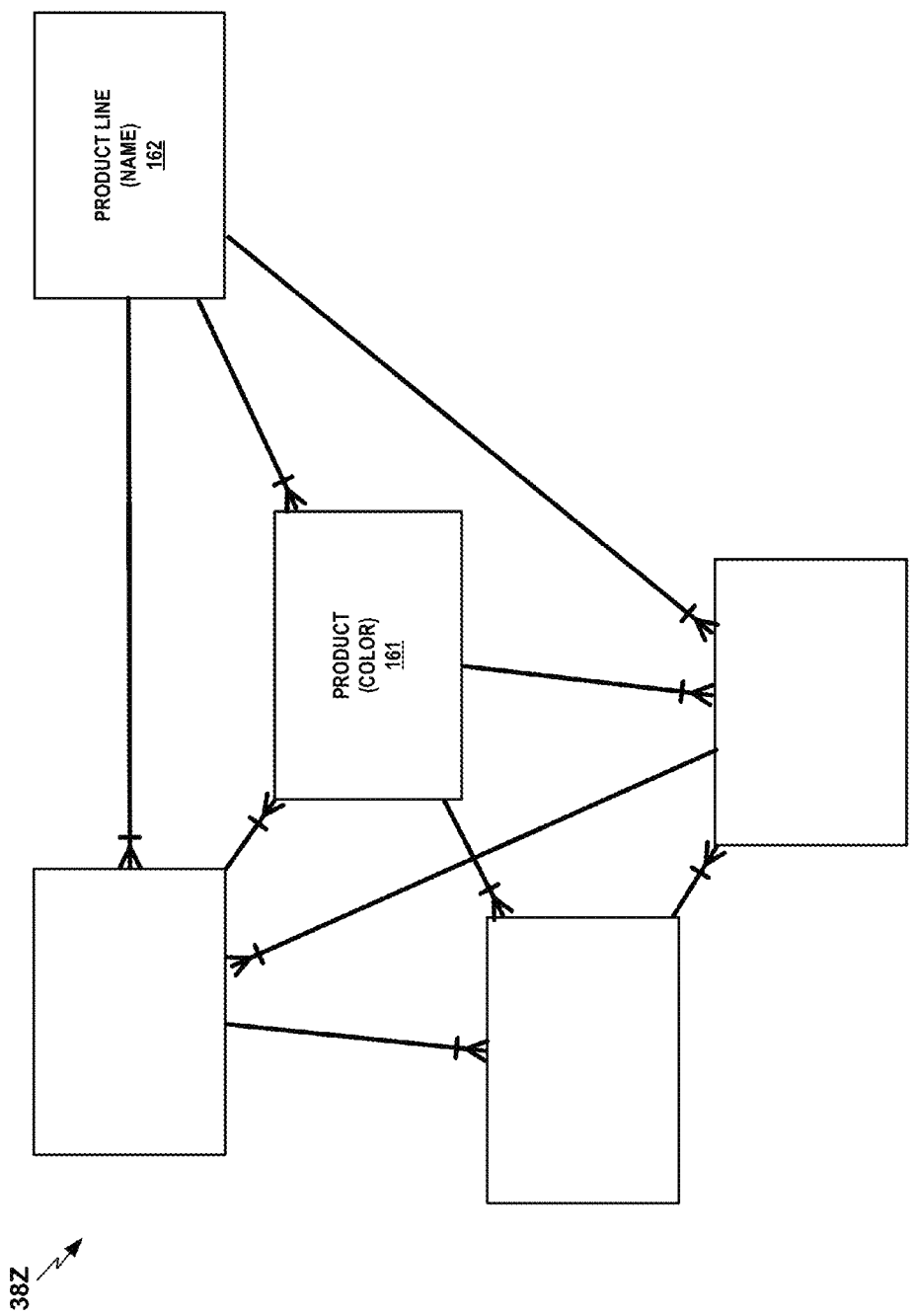
FIG. 7 depicts another example data collection from a database configured in a schema that does not have any data table with only one-to-many cardinality with other data tables, in another example of this disclosure.

FIG. 7 depicts another example data collection 38Z from a database configured in a schema that does not have any data table with only one-to-many cardinality with other data tables, in another example. In this case, natural language query management system 22 may not be able to rely on identifying a data table with only one-to-many cardinality with other data tables as an applicable fact table. Some databases may further not clearly indicate cardinality relationships between data tables, and or include clearly identifiable fact tables or fact columns. In such instances, natural language query management system 22 may evaluate and use other indications of applicable data and applicable query domains.

For instance, in this example, a user may enter a natural language query, "How many product lines are colored blue." Natural language query management system 22 may use semantic processing based on either or both of lexical matches or ontological concept matches between identified query terms and column or table headers or names, and thereby identify data column 161 with the header "product (color)" from a table entitled "product" as a match to the query concept of color, and identify data table 162 named "product line (name)" as matching the concept of "product line" from the natural language query.

Natural language query management system 22 may also secondarily seek and give heightened consideration to tables or columns with shortest paths between them, and with relationships in only one direction, and not circular; natural language query management system 22 may determine, as confirmatory evidence of applicable responsiveness to the natural language query, that table 162 and column 161 have a direct relationship, and no circular relationships with a continuous flow of one-to-many relationships around the circuit (e.g., product line table 162 only has many-to-one cardinality with other tables or columns). Natural language query management system 22 may thus identify data column 161 and data table 162 as the applicable context objects for the query domain in this example, relying on semantic matching and only secondarily on factors based on cardinalities with related tables.

In various examples including those described above, once natural language query management system 22 has identified or indexed potentially relevant data into one or more query domains, natural language query management system 22 may implement loading strategizing system 44 and determine a strategy for loading the data to client computing device 16A and natural language query management UI 39. Loading strategizing system 44 may evaluate the total size of the data encompassed by the one or more query domains, determine whether to divide the natural language query into several smaller queries narrowed by specific hierarchically ordered filters, and prioritize an order in which to execute the narrowed, segmented queries based on the initial query. By doing so, natural language query management system 22 may avoid executing a single query (e.g., a SQL query) on all the data encompassed by all the one or more query domains identified as relevant to the natural language query, which may in some cases involve excessively long load times, and may be far more data than the business user realizes or would have use for. Natural language query management system 22 may also use the information and parameters determined by loading strategizing system 44 to surface guidance, feedback, and user-enabled filtering options in natural language query management UI 39, as shown in FIG. 8.

Thus, in some examples, grouping the data sets into one or more query domains may be based at least in part on one or more relationships among the data sets. This may include identifying two or more data sets with lexical or ontological correlation with parsed query terms from the natural language query. In some examples, grouping the data sets into one or more query domains based at least in part on one or more relationships among the data sets may include identifying a data set that has one-to-many cardinality with one or more other data sets, and no many-to-one cardinality with any data set. The identified data set that has one-to-many cardinality with one or more other data sets and no many-to-one cardinality with any data set may be identified as a fact table. In some examples, grouping the data sets into one or more query domains based at least in part on one or more relationships among the data sets may further include identifying one or more data sets having a direct many-to-one cardinality relationship with the fact table. In some examples, grouping the data sets into one or more query domains based at least in part on one or more relationships among the data sets may include identifying a data set that has one-to-many cardinality with one or more other data sets, and no many-to-one cardinality with any data set.

Figure 8:
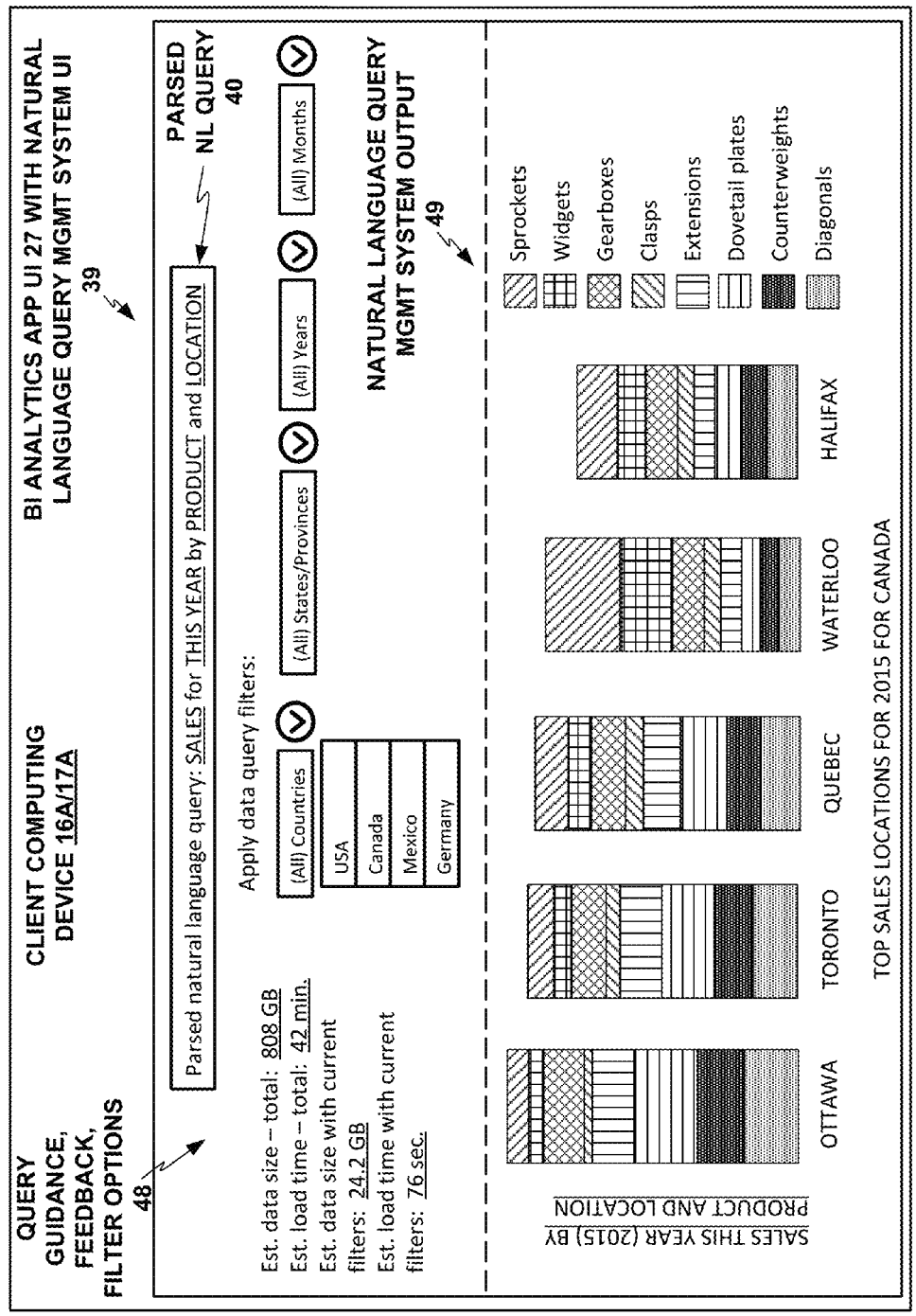
FIG. 8 shows a screenshot of an example BI analytics application user interface (UI) including an example natural language query management UI enabled by a natural language query management system to show guidance, feedback, and user-enabled filtering options for a natural language query, as well as initial outputs responsive to the natural language query, in one aspect of the disclosure.

FIG. 8 shows a screenshot of an example BI analytics application user interface (UI) 27 including an example natural language query management UI 39 enabled by natural language query management system 22 to show guidance, feedback, and user-enabled filtering options for a natural language query, as well as initial outputs responsive to the natural language query, in one aspect of the disclosure. BI analytics application UI 27 is rendered on a client computing device 16A/17A as in FIGS. 1 and 2. BI analytics application UI 27 may include example user input fields 40 enabling a user to enter a natural language query, such as "give me all sales for this year by product and branch location," and receive the guidance, feedback, and user filter options 48 as shown (also including a representation of parsed natural language query 40), and outputs responsive to the natural language query. As also shown, the user may see that the estimated amount of data and load time based on the initial query is more than the user wants, and the user may select filter options from one of several drop-down filter menus to manually filter the query by country, enabling a narrower set of results more relevant to the user's needs.

Natural language query management system 22 may also have already performed some filtering and prioritizing prior to presenting the natural language query management system output 49 and the query guidance, feedback, and user filter options 48 as shown in FIG. 8. For example, while the initial natural language query (e.g., as discussed above with reference to FIGS. 3-5) indicated data over time without any constraint on the span of time, natural language query management system 22 (e.g., loading strategizing system 44) may determine that the unbounded time constraint would specify all available data covering potentially several decades, and may instead determine to restrict the span of time substantially, such as by applying a time filter to only specify the current year (2015), as depicted in parsed query 40. This may reflect that a business user is unlikely to have use for the data for all available time, that retrieving the data for all available time would require excessive loading time (e.g., many hours), and that a business user may be likely not to have considered these implications of specifying a query for an unconstrained set of data covering all available time. Natural language query management system 22 may also include user-friendly drop-down menus for modifying the time filters as part of query feedback and filter options 48. In other examples, natural language query management system 22 may not filter out all data for other times besides the current year, but may filter for only the past three years, and may prioritize for the current year to be first, and then foregoing years in descending order of prioritization, reflecting that the most current data is likely to be of highest priority to the business user.

As another example of natural language query management system 22 performing initial pre-emptive filtering of the query based on prioritizing the data, natural language query management system 22 may also determine that the initial query specifies location but without constraint, and that this would specify a likely excessive amount of data compared to the user's business needs in a way the business user is unlikely to have anticipated. Natural language query management system 22 may thus also automatically apply an initial geographic location filter or at least an initial geographic prioritization, which natural language query management system 22 may base on the business user's location, or on business ontology information related to the particular business user, such as information that the user is responsible for sales in Canada. Natural language query management system 22 may thus either apply an initial geographic filter to the query to specify loading only data associated with the original natural language query terms in Canada, or natural language query management system 22 may apply a prioritizing of beginning to load the Canada-specific data first. Natural language query management system 22 (e.g., loading strategizing system 44 thereof) may also apply additional filtering and/or prioritizing based on various criteria or filtering and prioritizing logic rules or patterns based on the user's past queries or based on machine learning techniques applied across many users in the enterprise. For example, loading strategizing system 44 may determine from business ontology or human resources information that the user is based in Ottawa and primarily handles sales in Ontario, and may prioritize loading data for locations in Ontario.

Figure 9:
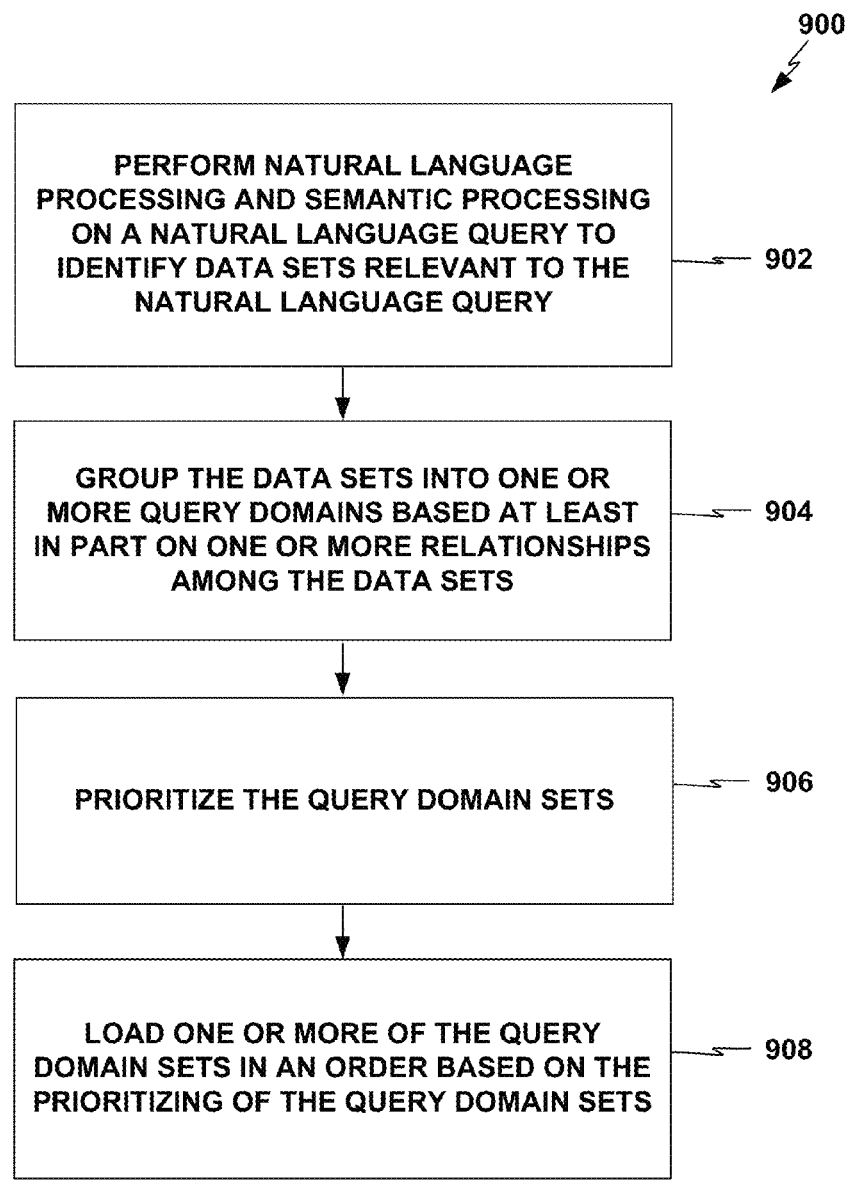
FIG. 9 depicts a flowchart of an example process that a natural language query management system, executing on one or more computing devices (e.g., servers, computers, processors, etc.), may perform, in one aspect of this disclosure.

FIG. 9 depicts a flowchart of an example process 900 that natural language query management system 22, executing on one or more computing devices (e.g., servers, computers, processors, etc.), may perform, in one aspect of this disclosure. Process 900 may include performing, with one or more processing devices, natural language processing and semantic processing on a natural language query to identify data sets relevant to the natural language query (902). Process 900 may further include grouping, with the one or more processing devices, the data sets into one or more query domains based at least in part on one or more relationships among the data sets (904). Process 900 may further include prioritizing, with the one or more processing devices, the query domain sets (906). Process 900 may further include loading, with the one or more processing devices, one or more of the query domain sets in an order based on the prioritizing of the query domain sets (908). Various implementations of process 900 may also include any of the processes described above.

Figure 10:
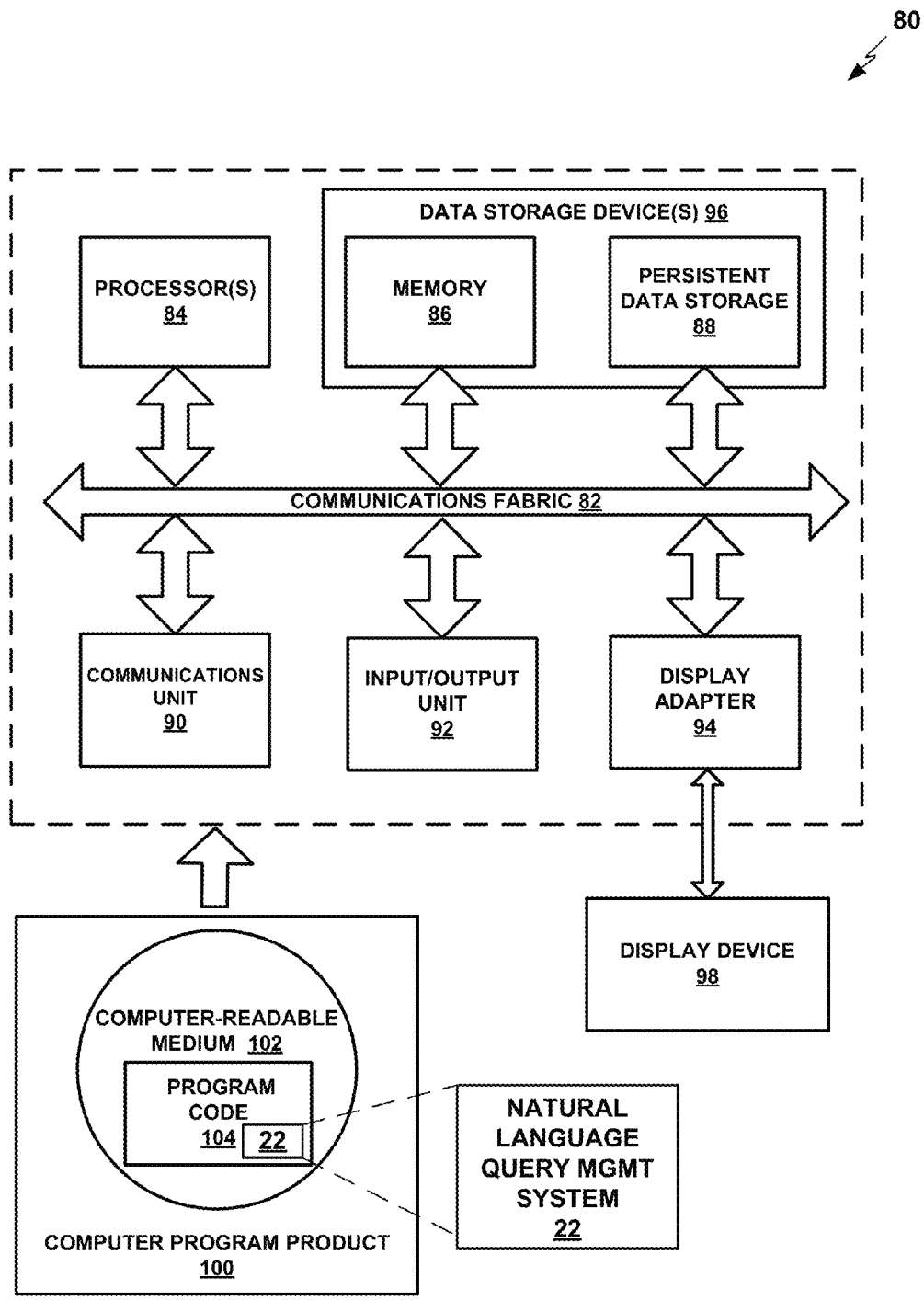
FIG. 10 is a block diagram of a computing device that may be used to implement a natural language query management system, in one aspect of this disclosure.

FIG. 10 is a block diagram of a computing device 80 that may be used to implement an natural language query management system 22, in one aspect of this disclosure. Computing device 80 may be a server such as one of web servers 14A or application servers 14B as depicted in FIG. 2. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 10, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a natural language query management system 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorterrange direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
performing, with one or more processing devices, natural language processing and semantic processing on a natural language query to identify data sets relevant to the natural language query;
grouping, with the one or more processing devices, the data sets into one or more query domains based at least in part on one or more relationships among the data sets, wherein each query domain includes a data set comprising a fact table that has one-to-many cardinality with a plurality of other data sets and no many-to-one cardinality with any data set, and one or more data sets each having a direct many-to-one cardinality relationship with the fact table;
prioritizing, with the one or more processing devices, the one or more query domains; and
loading, with the one or more processing devices, the one or more query domains in an order based on the prioritizing of the query domains.

2. The method of claim 1, further comprising filtering the one or more of the query domains into a plurality of filtered query domain sets prior to the prioritizing of the one or more query domains.

3. The method of claim 2, further comprising evaluating sizes of the one or more query domains, wherein the filtering the one or more of the query domains is based at least in part on the evaluated sizes of the one or more query domains.

4. The method of claim 1, further comprising presenting, in a user interface, one or more user menus for user-enabled filtering of the one or more query domains.

5. The method of claim 1, further comprising presenting, in a user interface, an indication of a size of the one or more query domains based on the natural language query.

6. The method of claim 1, further comprising presenting, in a user interface, an indication of a size of the one or more query domains based on filters applied to the natural language query.

7. The method of claim 1, further comprising presenting, in a user interface, an indication of a load time of the one or more query domains based on the natural language query.

8. The method of claim 1, further comprising presenting, in a user interface, an indication of a load time of the one or more query domains based on filters applied to the natural language query.

9. The method of claim 1, wherein the grouping the data sets into the one or more query domains comprises:
identifying two or more data sets with lexical or ontological correlation with parsed query terms from the natural language query.

10. A computer program product comprising a computer-readable storage medium having program code embodied therewith, the program code executable by a computing device to:
perform natural language processing and semantic processing on a natural language query to identify data sets relevant to the natural language query;
group the data sets into one or more query domains based at least in part on one or more relationships among the data sets, wherein each query domain includes a data set comprising a fact table that has one-to-many cardinality with a plurality of other data sets and no many-to-one cardinality with any data set, and one or more data sets each having a direct many-to-one cardinality relationship with the fact table;
prioritize the one or more query domains; and
load, with the one or more processing devices, the one or more query domains in an order based on the prioritizing of the query domains.

11. The computer program product of claim 10, wherein the program code is further executable by the computing device to evaluate sizes of the one or more query domains, wherein the filtering the one or more of the query domains is based at least in part on the evaluated sizes of the one or more query domains.

12. The computer program product of claim 10, wherein the program code is further executable by the computing device to filter the one or more of the query domains into a plurality of filtered query domain sets prior to the prioritizing of the one or more query domains.

13. The computer program product of claim 10, wherein the program code is further executable by the computing device to present, in a user interface, one or more user menus for user-enabled filtering of the one or more query domains.

14. A computer system comprising:
one or more hardware processors, one or more computer-readable memories, and one or more computer-readable, tangible storage devices;
program instructions, stored on at least one of the one or more storage devices for execution by at least one of the one or more processors via at least one of the one or more memories, to perform natural language processing and semantic processing on a natural language query to identify data sets relevant to the natural language query;
program instructions, stored on at least one of the one or more storage devices for execution by at least one of the one or more processors via at least one of the one or more memories, group the data sets into one or more query domains based at least in part on one or more relationships among the data sets, wherein each query domain includes a data set comprising a fact table that has one-to-many cardinality with a plurality of other data sets and no many-to-one cardinality with any data set, and one or more data sets each having a direct many-to-one cardinality relationship with the fact table;
program instructions, stored on at least one of the one or more storage devices for execution by at least one of the one or more processors via at least one of the one or more memories, to prioritize the one or more query domains; and
program instructions, stored on at least one of the one or more storage devices for execution by at least one of the one or more processors via at least one of the one or more memories, to load the one or more query domains in an order based on the prioritizing of the query domains.

15. The computer system of claim 14, further comprising program instructions to evaluate sizes of the one or more query domains, wherein the filtering the one or more of the query domains is based at least in part on the evaluated sizes of the one or more query domains.

16. The computer system of claim 14, further comprising program instructions to filter the one or more of the query domains into a plurality of filtered query domain sets prior to the prioritizing of the one or more query domains.

17. The computer system of claim 14, further comprising program instructions to present, in a user interface, one or more user menus for user-enabled filtering of the one or more query domains.

* * * * *